US010261221B2

(12) United States Patent
Whitehead

(10) Patent No.: US 10,261,221 B2
(45) Date of Patent: Apr. 16, 2019

(54) CORNER REFLECTOR REFLECTIVE IMAGE DISPLAY

(71) Applicant: CLEARink Displays, Inc., Fremont, CA (US)

(72) Inventor: Lorne A. Whitehead, Vancouver (CA)

(73) Assignee: CLEARink Displays, Inc., Fremont, CA (US)

( * ) Notice: Subject to any disclaimer, the term of this patent is extended or adjusted under 35 U.S.C. 154(b) by 0 days.

(21) Appl. No.: 15/367,449

(22) Filed: Dec. 2, 2016

(65) Prior Publication Data

US 2017/0160448 A1 Jun. 8, 2017

Related U.S. Application Data

(60) Provisional application No. 62/263,653, filed on Dec. 6, 2015.

(51) Int. Cl.
| | | |
|---|---|---|
| *G02B 26/00* | (2006.01) | |
| *G02B 26/08* | (2006.01) | |
| *G02F 1/29* | (2006.01) | |
| *G02B 5/124* | (2006.01) | |
| *G02F 1/167* | (2019.01) | |
| *G02F 1/133* | (2006.01) | |

(52) U.S. Cl.
CPC ......... *G02B 5/124* (2013.01); *G02F 1/13306* (2013.01); *G02F 1/167* (2013.01)

(58) Field of Classification Search
CPC .. G02F 1/167; G02F 1/136; G02F 2001/1676; G02F 1/133553; G02F 1/1336; G02F 1/13439; G02F 1/137; G02F 1/315; G02F 2001/133616; G02F 2001/1672; G02F 2203/023; G02F 2203/026; G02F 1/0063; G02F 1/0123; G02F 1/0311; G02F 1/13306; G02F 1/133
USPC ................ 359/237, 242, 265–267, 270–273, 359/290–292, 295, 296, 298, 315, 321, 359/322
See application file for complete search history.

(56) References Cited

U.S. PATENT DOCUMENTS

| | | |
|---|---|---|
| 3,792,308 A | 2/1974 | Ota et al. |
| 3,919,031 A | 11/1975 | White |
| (Continued) | | |

FOREIGN PATENT DOCUMENTS

| | | |
|---|---|---|
| AT | 333109 T | 8/2006 |
| CA | 2292441 C | 7/2002 |
| (Continued) | | |

OTHER PUBLICATIONS

International Search Report and Written Opinion dated Jul. 8, 2014 for PCT Application No. PCT/US2013/049606.

(Continued)

*Primary Examiner* — Brandi N Thomas
(74) *Attorney, Agent, or Firm* — Dianoosh Salehi

(57) ABSTRACT

Corner cubes are well known retro-reflective devices. Corner cubes may be employed for high brightness in reflective image displays. An embodiment of a reflective image display is disclosed that employs corner cubes with metallized surfaces. Light reflection and absorption may be modulated with electrophoretically mobile light absorbing particles or electrofluidic systems. Display images may be created to convey information to a viewer.

8 Claims, 9 Drawing Sheets

(56) References Cited

U.S. PATENT DOCUMENTS

| | | |
|---|---|---|
| 4,025,674 A | 5/1977 | Mizuochi |
| 4,071,430 A | 1/1978 | Liebert |
| 4,203,106 A | 5/1980 | Dalisa et al. |
| 4,648,956 A | 3/1987 | Marhsall et al. |
| 4,821,092 A | 4/1989 | Noguchi |
| 5,019,748 A | 5/1991 | Appelberg |
| 5,319,491 A | 6/1994 | Selbrede |
| 5,359,346 A | 10/1994 | DiSanto |
| 5,396,350 A | 3/1995 | Beeson et al. |
| 5,596,671 A | 1/1997 | Rockwell, III |
| 5,871,653 A | 2/1999 | Ling |
| 5,959,777 A | 9/1999 | Whitehead |
| 5,999,307 A | 12/1999 | Whitehead et al. |
| 6,064,784 A | 5/2000 | Whitehead et al. |
| 6,215,920 B1 | 4/2001 | Whitehead et al. |
| 6,304,365 B1 | 10/2001 | Whitehead et al. |
| 6,376,828 B1 | 4/2002 | Barrett |
| 6,377,383 B1 | 4/2002 | Whitehead et al. |
| 6,384,979 B1 | 5/2002 | Whitehead et al. |
| 6,437,921 B1 | 8/2002 | Whitehead et al. |
| 6,452,734 B1 | 9/2002 | Whitehead et al. |
| 6,574,025 B2 | 6/2003 | Whitehead et al. |
| 6,751,008 B2 | 6/2004 | Liang et al. |
| 6,787,976 B2 * | 9/2004 | Minoura .................. H01J 1/70 313/110 |
| 6,822,783 B2 | 11/2004 | Matsuda et al. |
| 6,842,279 B2 | 1/2005 | Amundson |
| 6,865,011 B2 | 3/2005 | Whitehead et al. |
| 6,885,496 B2 | 4/2005 | Whitehead et al. |
| 6,891,658 B2 | 5/2005 | Whitehead et al. |
| 7,046,439 B2 | 5/2006 | Kaminsky et al. |
| 7,093,968 B2 | 8/2006 | Hsueh et al. |
| 7,164,536 B2 | 1/2007 | Whitehead |
| 7,170,670 B2 | 1/2007 | Webber |
| 7,259,744 B2 | 8/2007 | Arango et al. |
| 7,286,280 B2 | 10/2007 | Whitehead et al. |
| 7,324,263 B2 | 1/2008 | Johnson et al. |
| 7,422,964 B2 | 9/2008 | Akiyama |
| 7,439,948 B2 | 10/2008 | Johnson et al. |
| 7,454,103 B2 | 11/2008 | Parriaux |
| 7,463,398 B2 | 12/2008 | Feenstra |
| 7,507,012 B2 | 3/2009 | Aylward et al. |
| 7,515,326 B2 | 4/2009 | Ibrede et al. |
| 7,564,614 B2 | 7/2009 | Chen et al. |
| 7,660,509 B2 | 2/2010 | Bryan et al. |
| 7,740,387 B2 | 6/2010 | Schultz et al. |
| 7,760,417 B2 | 7/2010 | Whitehead |
| 7,775,700 B2 | 8/2010 | Lee |
| 7,852,430 B1 | 12/2010 | Gettmey |
| 7,940,457 B2 | 5/2011 | Jain et al. |
| 8,022,615 B2 | 9/2011 | Bai et al. |
| 8,040,591 B2 | 10/2011 | Whitehead |
| 8,094,364 B2 | 1/2012 | Park |
| 8,179,034 B2 | 5/2012 | Potts et al. |
| 8,384,659 B2 | 2/2013 | Yeo et al. |
| 8,587,512 B2 | 11/2013 | Hiji et al. |
| 8,690,408 B2 | 4/2014 | Li |
| 9,360,696 B1 | 6/2016 | Ghali et al. |
| 9,377,574 B2 | 6/2016 | Li |
| 9,612,501 B2 | 4/2017 | Whitehead |
| 2002/0063963 A1 | 5/2002 | Whitehead et al. |
| 2002/0089735 A1 | 7/2002 | Albert et al. |
| 2002/0171910 A1 | 11/2002 | Pullen et al. |
| 2003/0038755 A1 | 2/2003 | Amundson et al. |
| 2003/0067666 A1 | 4/2003 | Kawai |
| 2003/0165016 A1 | 9/2003 | Whitehead et al. |
| 2003/0179327 A1 | 9/2003 | Nonaka et al. |
| 2003/0214697 A1 | 11/2003 | Duthaler et al. |
| 2004/0136047 A1 | 7/2004 | Whitehead et al. |
| 2004/0174584 A1 | 9/2004 | Whitehead et al. |
| 2004/0177237 A1 | 9/2004 | Huppenthal et al. |
| 2004/0179145 A1 | 9/2004 | Jacobsen et al. |
| 2004/0239613 A1 | 12/2004 | Kishi |
| 2005/0007000 A1 | 1/2005 | Chou et al. |
| 2005/0068287 A1 | 3/2005 | Lin et al. |
| 2005/0270439 A1 | 12/2005 | Weber et al. |
| 2006/0056009 A1 | 3/2006 | Kombrekke et al. |
| 2006/0148262 A1 | 7/2006 | Lee et al. |
| 2006/0170330 A1 | 8/2006 | Disanto et al. |
| 2006/0209418 A1 | 9/2006 | Whitehead |
| 2006/0291034 A1 | 12/2006 | Patry et al. |
| 2007/0008739 A1 | 1/2007 | Kim et al. |
| 2007/0019434 A1 | 1/2007 | Lee |
| 2007/0046623 A1 | 3/2007 | Song |
| 2007/0047003 A1 | 3/2007 | Suwabe |
| 2007/0091434 A1 | 4/2007 | Garner et al. |
| 2007/0195231 A1 | 8/2007 | Kuribayashi et al. |
| 2007/0195391 A1 | 9/2007 | Nishikawa et al. |
| 2007/0263137 A1 | 11/2007 | Shigeta et al. |
| 2007/0263291 A1 | 11/2007 | Whitehead |
| 2008/0002247 A1 | 1/2008 | Nagato et al. |
| 2008/0024432 A1 | 1/2008 | Lee et al. |
| 2008/0030661 A1 | 2/2008 | Tung et al. |
| 2008/0043184 A1 | 2/2008 | Tung et al. |
| 2008/0174852 A1 | 7/2008 | Hirai et al. |
| 2008/0203910 A1 | 8/2008 | Reynolds |
| 2008/0204854 A1 | 8/2008 | Whitehead et al. |
| 2008/0218845 A1 | 9/2008 | Murakami |
| 2008/0219024 A1 | 9/2008 | Mi et al. |
| 2008/0231960 A1 | 9/2008 | Van Gorkom et al. |
| 2008/0266245 A1 | 10/2008 | Wilcox |
| 2008/0266646 A1 | 10/2008 | Wilcox et al. |
| 2008/0285282 A1 | 11/2008 | Karman et al. |
| 2008/0297496 A1 | 12/2008 | Watson et al. |
| 2008/0303994 A1 | 12/2008 | Jeng et al. |
| 2008/0304134 A1 | 12/2008 | Ban |
| 2009/0096745 A1 | 4/2009 | Sprague et al. |
| 2009/0109172 A1 | 4/2009 | Lee et al. |
| 2009/0141221 A1 | 6/2009 | Taguchi et al. |
| 2009/0201565 A1 | 8/2009 | Bita et al. |
| 2009/0201570 A1 | 8/2009 | Frazier et al. |
| 2009/0207476 A1 | 8/2009 | Yanagisawa et al. |
| 2009/0225398 A1 | 9/2009 | Duthaler et al. |
| 2009/0231714 A1 | 9/2009 | Zhao et al. |
| 2009/0244935 A1 | 10/2009 | Hsieh et al. |
| 2009/0256810 A1 | 10/2009 | Pasquariello |
| 2009/0262083 A1 | 10/2009 | Parekh |
| 2009/0262414 A1 | 10/2009 | Whitehead |
| 2009/0273746 A1 | 11/2009 | Uehara et al. |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeelen et al. |
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0245375 A1 | 9/2010 | Rhodes |
| 2010/0253711 A1 | 10/2010 | Muroi |
| 2011/0007381 A1 | 1/2011 | Paolini, Jr. et al. |
| 2011/0032460 A1 | 2/2011 | Lee et al. |
| 2011/0043435 A1 | 2/2011 | Hebenstreit et al. |
| 2011/0051054 A1 | 3/2011 | Wang et al. |
| 2011/0085116 A1 | 4/2011 | Kim |
| 2011/0085232 A1 | 4/2011 | Werner et al. |
| 2011/0273906 A1 | 10/2011 | Nichol et al. |
| 2011/0279442 A1 | 11/2011 | Hale et al. |
| 2011/0299014 A1 | 12/2011 | Jang et al. |
| 2011/0304902 A1 | 12/2011 | Yeo et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0062981 A1 | 3/2012 | Komatsu et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1 | 10/2012 | Swic |
| 2012/0287380 A1 | 11/2012 | Hagiwara et al. |
| 2012/0293857 A1 | 11/2012 | Kwon et al. |
| 2013/0050806 A1 | 2/2013 | Yasui et al. |

(56) References Cited

U.S. PATENT DOCUMENTS

| | | |
|---|---|---|
| 2013/0077284 A1 | 3/2013 | Chang et al. |
| 2013/0135320 A1 | 5/2013 | Govil |
| 2013/0155723 A1 | 6/2013 | Coleman |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0049448 A1 | 2/2014 | Christensen |
| 2014/0063586 A1 | 3/2014 | Jung et al. |
| 2014/0160185 A1 | 6/2014 | Okuno et al. |
| 2014/0333989 A1 | 11/2014 | Whitehead |
| 2014/0340376 A1 | 11/2014 | Itagaki et al. |
| 2015/0146273 A1 | 5/2015 | Whitehead |
| 2015/0234250 A1 | 8/2015 | Lin et al. |
| 2016/0026061 A1 | 1/2016 | O'Keeffe |
| 2016/0097961 A1 | 4/2016 | Whitehead |
| 2016/0116815 A1 | 4/2016 | Whitehead |
| 2016/0139478 A1 | 5/2016 | Whitehead |
| 2016/0147128 A1 | 5/2016 | Loxley et al. |
| 2016/0155399 A1 | 6/2016 | Tripathi et al. |
| 2016/0216561 A1 | 7/2016 | Lee et al. |
| 2016/0231475 A1 | 8/2016 | Whitehead |
| 2016/0246155 A1* | 8/2016 | Loxley ............... G02F 1/167 |
| 2016/0274435 A1 | 9/2016 | Whitehead |
| 2016/0349592 A1 | 12/2016 | Goulding et al. |
| 2016/0363811 A1 | 12/2016 | Zhong et al. |
| 2016/0377950 A1 | 12/2016 | Zhang |
| 2017/0068145 A1 | 3/2017 | Nakamura et al. |
| 2017/0075184 A1 | 3/2017 | Low et al. |
| 2017/0160444 A1 | 6/2017 | Sadlik |
| 2017/0160620 A1 | 6/2017 | Whitehead |
| 2017/0287406 A1 | 10/2017 | Whitehead |
| 2017/0299935 A1 | 10/2017 | Whitehead |
| 2018/0017838 A1 | 1/2018 | Thomas |
| 2018/0031941 A1 | 2/2018 | Goulding |
| 2018/0157144 A1 | 6/2018 | Sadlik |
| 2018/0173074 A1 | 6/2018 | Zhang |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1308734 A | 8/2001 |
| CN | 1173208 C | 10/2004 |
| CN | 1639625 A | 7/2005 |
| CN | 101160547 A | 4/2008 |
| CN | 1454327 A | 9/2008 |
| CN | 102955318 A | 3/2013 |
| CN | 103207495 A | 7/2013 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| TW | 201024886 A | 7/2010 |
| WO | 2003075085 | 9/2003 |
| WO | 2005010604 | 2/2005 |
| WO | 2006108285 | 10/2006 |
| WO | 2006114743 | 11/2006 |
| WO | 2008103554 A1 | 8/2008 |
| WO | 2012021121 A1 | 2/2012 |
| WO | 2014092729 A1 | 6/2014 |
| WO | 2014146937 | 9/2014 |
| WO | 2014160552 A1 | 10/2014 |
| WO | 2014189751 A1 | 11/2014 |
| WO | 2015005899 A2 | 1/2015 |
| WO | 2015061538 A1 | 4/2015 |
| WO | 2015116913 | 8/2015 |
| WO | 2015175518 | 11/2015 |
| WO | 2016057613 A1 | 4/2016 |
| WO | 2016085835 A1 | 6/2016 |
| WO | 2016109273 A1 | 7/2016 |
| WO | 2016130720 | 8/2016 |
| WO | 2007072355 A2 | 6/2017 |
| WO | 2017100157 A1 | 6/2017 |
| WO | 2017105443 A1 | 6/2017 |
| WO | 2017147449 A1 | 8/2017 |
| WO | 2017205312 A1 | 11/2017 |
| WO | 2017040628 A1 | 3/2018 |

OTHER PUBLICATIONS

International Search Report and Written Opinion dated Dec. 30, 2014 for PCT Application No. PCT/US2014/058118.

International Search Report and Written Opinion dated Aug. 11, 2014 for PCT Application No. PCT/US2014/030966.

International Search Report and Written Opinion dated Sep. 19, 2014 for PCT Application No. PCT/US2014/038091.

International Search Report and Written Opinion dated Oct. 1, 2015 for PCT Application No. PCT/US2015/030349.

International Search Report and Written Opinion dated Apr. 3, 2015 for PCT Application No. PCT/US2014/061911.

International Search Report and Written Opinion dated Mar. 1, 2016 for PCT Application No. PCT/US2015/013725.

International Search Report and Written Opinion dated Jan. 27, 2016 for PCT Application No. PCT/US2015/054385.

International Search Report and Written Opinion dated Mar. 2, 2016 for PCT Application No. PCT/US2015/062075.

International Search Report and Written Opinion dated Apr. 13, 2016 for PCT Application No. PCT/US2015/066980.

International Search Report and Written Opinion dated Apr. 21, 2016 for PCT Application No. PCT/US2016/017416.

International Search Report and Written Opinion dated Mar. 28, 2016 for PCT Application No. PCT/US2015/066150.

Mossman, M. A. et al., "A Novel Reflective Image Display Using Total Internal Reflection" Displays Devices, DEMPA Publications, Tokyo JP vol. 25, No. 5 Dec. 1, 2004 pp. 215-221.

Mossman et al. "Brightness Enhancement in TIR-Modulated Electrophoretic Reflective Image Displays", (Biblio).

Atsuhito et al. "Electrophoresis Device, Method of Manufacturing the Electrophoresis Device, Display, Display Substrate, and Electronic Unit", (Abstract).

Gou, S. et al., "Transparent Superhydrophobic Surfaces for Applications of Controlled Reflectance" Applied Optics vol. 51, Issue No. 11, Apr. 10, 2012, pp. 1645-1653.

Whitehead, L. et al., "The Many Roles of Illumination in Information Display" Society for Information Display Symposium (Invited Paper), Issue No. 0097-966X/06/3701-0000, May 2010.

Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.

Whitehead, L. et al., "Reflections on Total Internal Reflection" Optics and Photonics News Feb. 2009, pp. 28-34.

Mossman, M. et al., "Observations of Total Internal Reflection at a Natural Super-Hydrophobic Surface" Physics in Canada vol. 64, Issue No. 1, Mar. 2008, pp. 7-11.

Hrudey, P. et al., "Application of Transparent Nanostructured Electrodes for Modulation of Total Internal Reflection" SPIE 2007 Conference Paper No. 6647 Aug. 2007, pp. 1-12.

Hrudey, P. et al., "Variable Diffraction Gratings Using Nanoporous Electrodes and Electrophoresis of Dye Ions" SPIE 2007 Conference Paper No. 6645 Aug. 2007, pp. 1-12.

Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.

(56) References Cited

OTHER PUBLICATIONS

Mossman, M. et al., "Off the Beaten Path with Total Internal Reflection" International Optical Design Conference (Invited Paper), Jun. 2006, pp. 1-12.

Whitehead, L. et al., "Total Internal Reflection for Illumination and Displays" SPIE Newsroom Sep. 7-8, 2006.

Mossman, M. et al., "Controlled Frustration of TIR by Electrophoresis of Pigment Particles" Applied Optics vol. 44, Issue No. 9, Mar. 20, 2005, pp. 1601-1609.

Kwong, V. et al., "Control of Reflectance of Liquid Droplets by Means of Electrowetting" Applied Optics vol. 43, Issue No. 4, Feb. 1, 2004, pp. 808-813.

Mossman, M. et al. "A High Reflectance, Wide Viewing Angle Reflective Display Using Total Internal Reflection in Micro-Hemispheres" International Display Research Conference, Issue No. 1083-1312/00/2003-0233, Sep. 2003, pp. 233-236.

Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.

Coope, R. et al., "Modulation of Retroreflection by Controlled Frustration of Total Internal Reflection" Applied Optics vol. 41, Issue No. 25, Sep. 1, 2002, pp. 5357-5361.

Mossman, M. et al., "New Method for Maintaining Long Term Image Quality in a TIR Based Electrophoretic Display" International Display Research Conference, Nice, France, Eurodisplay Oct. 2002, pp. 851-854.

Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.

Whitehead, L. et al., "Visual Applications of Total Internal Reflection in Prismatic Microstructures" Physics in Canada Nov./Dec. 2001, pp. 329-335.

Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.

Kambe, N. et al., "Refractive Index Engineering of nano-Polymer Composites," Symposium, Apr. 20, 2001, 6 pages, Materials Research Society Symposium Proceedings, Pittsburgh, PA.

Robben, B. et al., "Electrodynamics of Electronic Paper Based on Total Internal Reflection," Journal, Sep. 20, 2018, pp. 034041-1-034041-11, DOI 10.1103/PhysRevApplied.10.034041, Americal Physical Society.

* cited by examiner

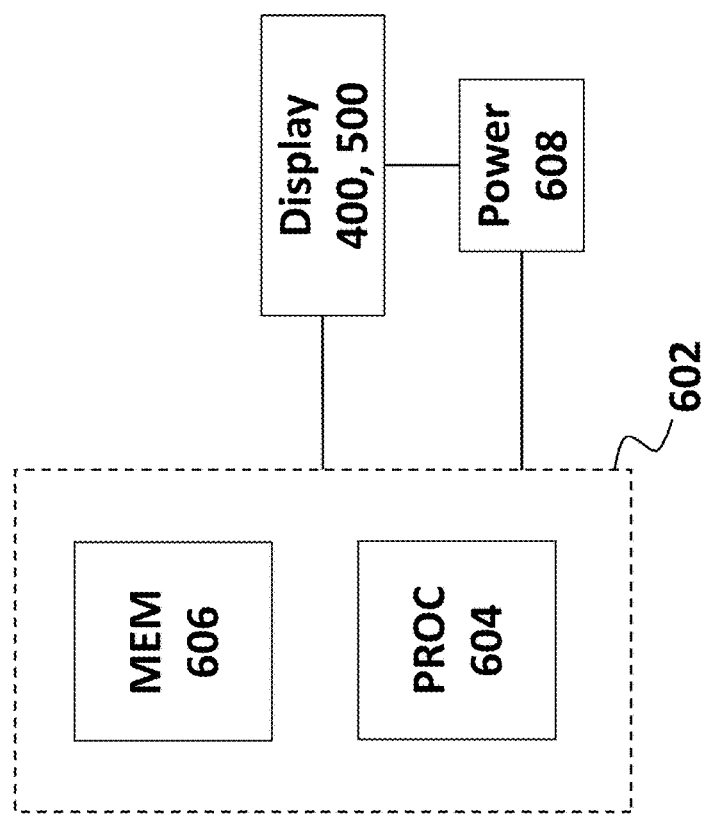

CORNER REFLECTOR REFLECTIVE IMAGE DISPLAY

The disclosure claims priority to the filing date of U.S. Provisional Application No. 62/263,653, filed on Dec. 6, 2015, the specification of which is incorporated herein in its entirety.

FIELD

This disclosure generally relates to reflective image displays. Specifically, an embodiment of the disclosure relates to a light modulating corner reflector system to modulate light using electrophoretically mobile light absorbing particles.

BACKGROUND

Optical corner reflectors (also known as corner cubes) are known light reflective devices. FIG. 1 schematically illustrates light reflection in a conventional corner retro-reflector. As shown in corner reflector 100 of FIG. 1, a light ray 102 incident on a portion of a corner reflector 100 may undergo specular reflection in each of three separate reflections 104, 106, 108 at the three perpendicularly opposed facets 110, 112, 114 that form the corner. The incident light 102 may be retro-reflected as light ray 116 by the corner reflector such that it is reflected in a direction opposite to the direction of the incident light 102.

Optical corner reflectors are conventionally used in a variety of applications such as automobile and bicycle taillights. Optical corner reflectors may also be used in reflective sheeting materials for static street signs to improve visibility at night. Due to the ability of optical corner reflectors to reflect light efficiently and effectively they may be utilized in electronically switchable (i.e., addressable) reflective image displays.

BRIEF DESCRIPTION OF DRAWINGS

These and other embodiments of the disclosure will be discussed with reference to the following exemplary and non-limiting illustrations, in which like elements are numbered similarly, and where:

FIG. 6 schematically illustrates an exemplary system for controlling a display according to an embodiment of the disclosure.

DETAILED DESCRIPTION

The exemplary embodiments disclosed herein provide a reflective image display comprising a corner reflector sheet. In certain embodiments, the outward surfaces of a corner reflector sheet may be directionally coated with a metal that may act as a light reflector and front electrode layer. Portions of the corner reflector sheet may be coated and removed to create passageways for electrophoretically mobile light absorbing particles dispersed in a medium. The particles may be controlled by a bias (voltage or current) to modulate the reflected and absorbed light to create images. In other embodiments, an electrofluidic system may be used to modulate the reflected and absorbed light to create images.

Figure 1:
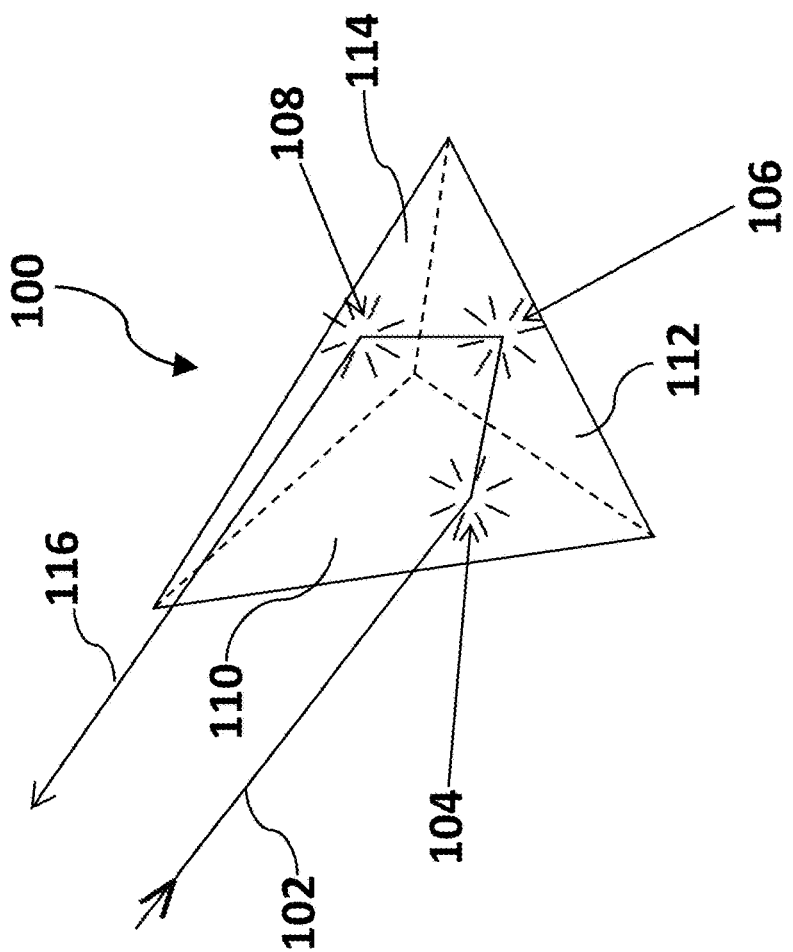
FIG. 1 illustrates light reflection in a prior art corner reflector retro-reflector.
Figure 2A:
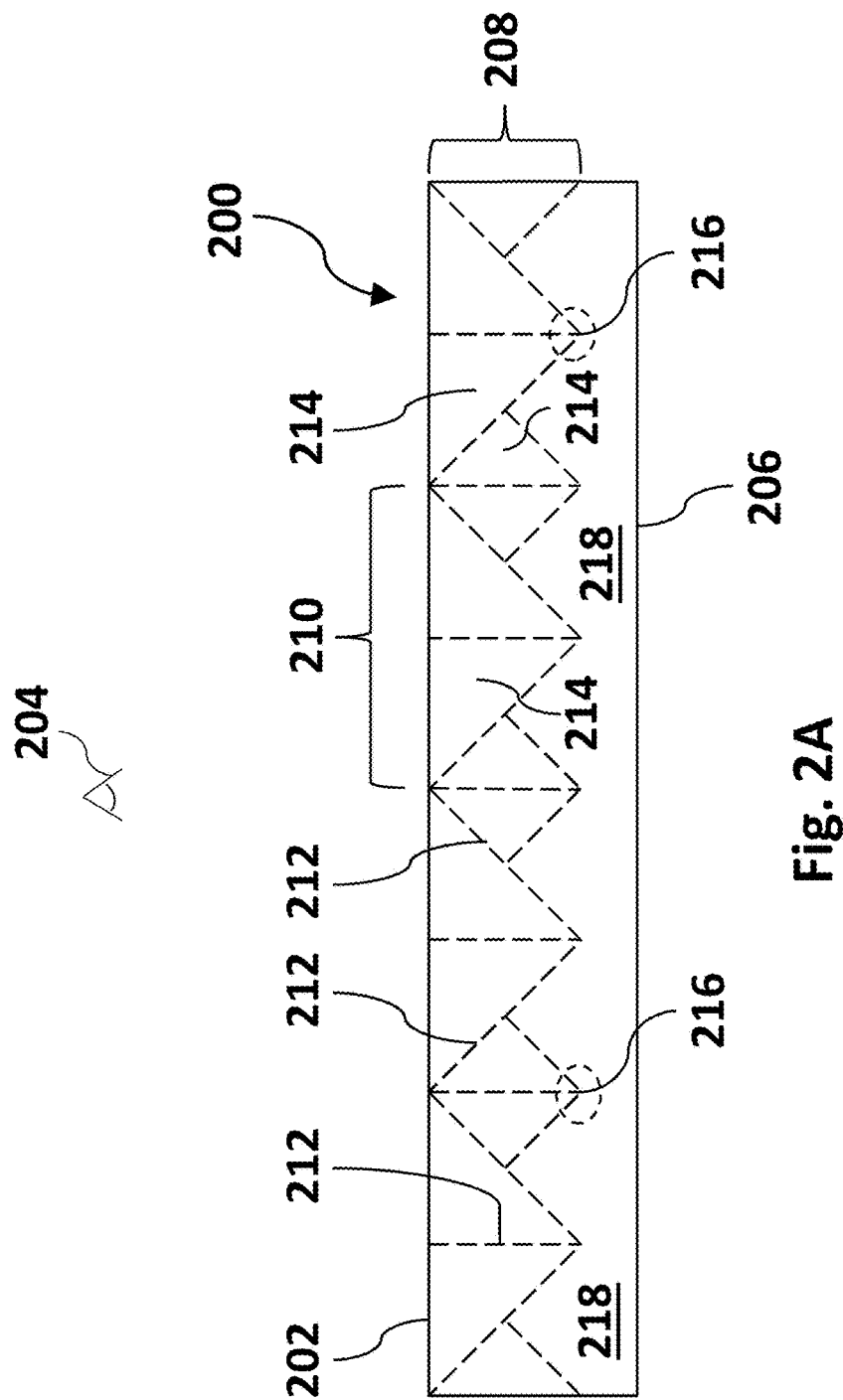
FIG. 2A illustrates a cross-section of a corner reflector sheet according to one embodiment of the disclosure.

FIG. 2A illustrates a cross-section of a corner reflector sheet according to one embodiment of the disclosure. In the exemplary embodiment of FIG. 2A, corner reflector sheet 200 includes top surface 202 facing viewer 204 and rear surface 206. Corner reflector sheet 200 may comprise regions where material has been removed to create a plurality of corner cubes 208. Each individual corner cube 210 may comprise three angles of about 90° that are represented by dotted lines 212 in FIG. 2A. The substantially right-angle locations may connect the perpendicularly opposed sides or facets 214 of the corner cubes 210. In other embodiments, angles other than about 90° may also be used for the corner cubes depending upon the application. For example, the angles may be slightly modified such that the light is redirected preferentially toward the viewer 204 for a particular display application under a typical expected illumination condition. The angles may be more or less than about 90°. The angles within the individual corner cubes may be a combination of angles that are about 90° and others that may be less than or greater than 90°. These angles may include 80°, 85°, 90°, 95°, 100°, 105°, 110° and 115° to name a few. The angles may include a combination of the recited angles.

The deepest recess or portion of each corner cube 216 is highlighted by dotted line circle. The remaining material that has not been removed to create corner cubes acts as support material 218.

Figure 2B:
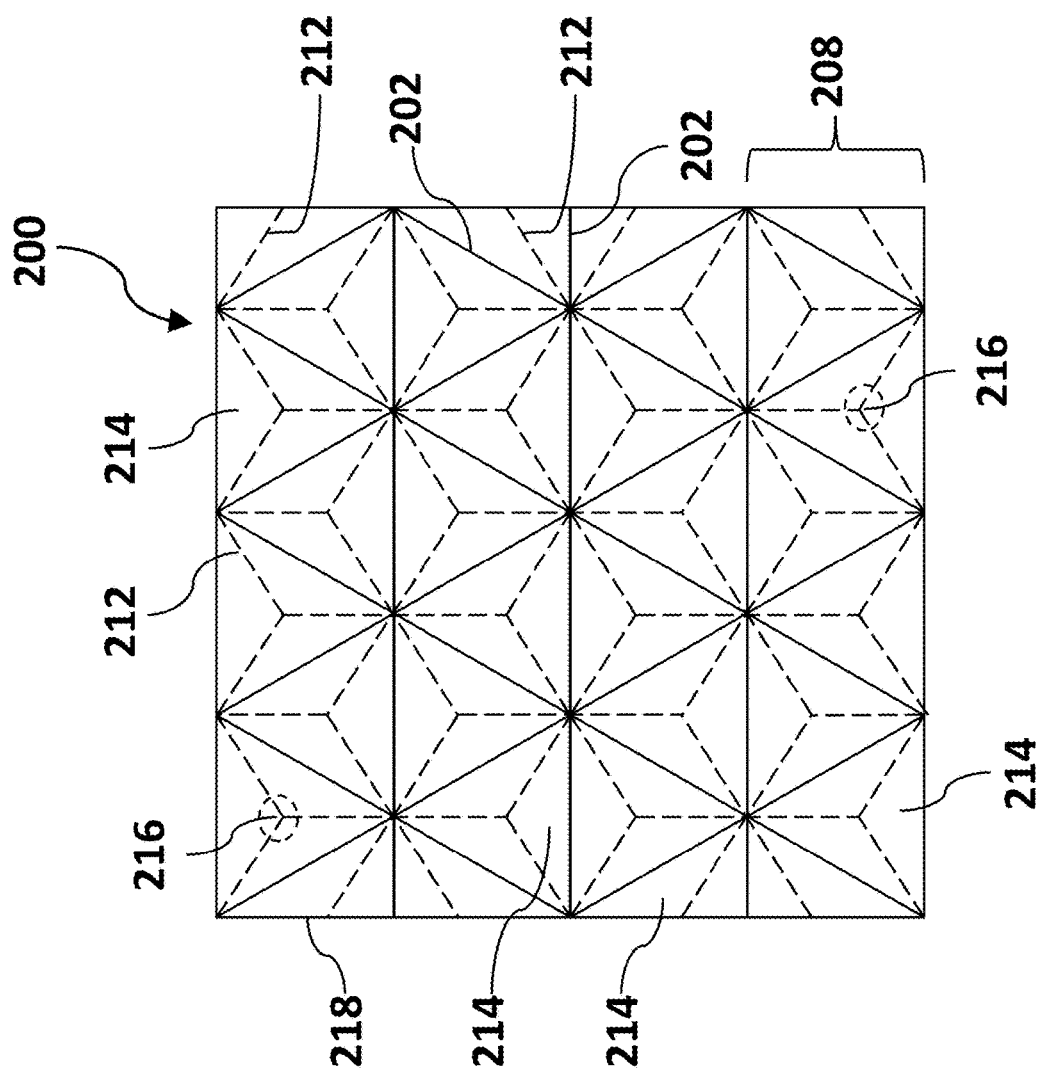
FIG. 2B illustrates a top view of a corner reflector sheet according to one embodiment of the disclosure.

FIG. 2B illustrates a top view of a corner reflector sheet according to one embodiment of the disclosure. The view of FIG. 2B is the view which a viewer 204 may observe when looking down on the top surface 202 of sheet 200. The rear surface 206 on the opposite side of sheet 200 as shown in FIG. 2A and can't be seen by viewer 204 in FIG. 2B. The top edges or high ridges 202 are represented by solid lines and are approximately in the same plane. Sheet 200 comprises rows 208 of pluralities of corner cubes which may be more clearly observed in this view. Each corner cube comprises three facets 214. Each facet 214 in a corner cube may be connected at a corner angle and represented by dotted lines 212. The corner angles 212 extend away from the solid lines and away from the top surface. Corner angles 212 meet at a depression or valley 216 or where the deepest portion 216 of each corner cube exists and highlighted by a dotted line circle. Facets 214 that are connected by a solid line may be about a substantially 60° angle with respect to each other though other angles may be used depending upon the application.

Figure 2C:
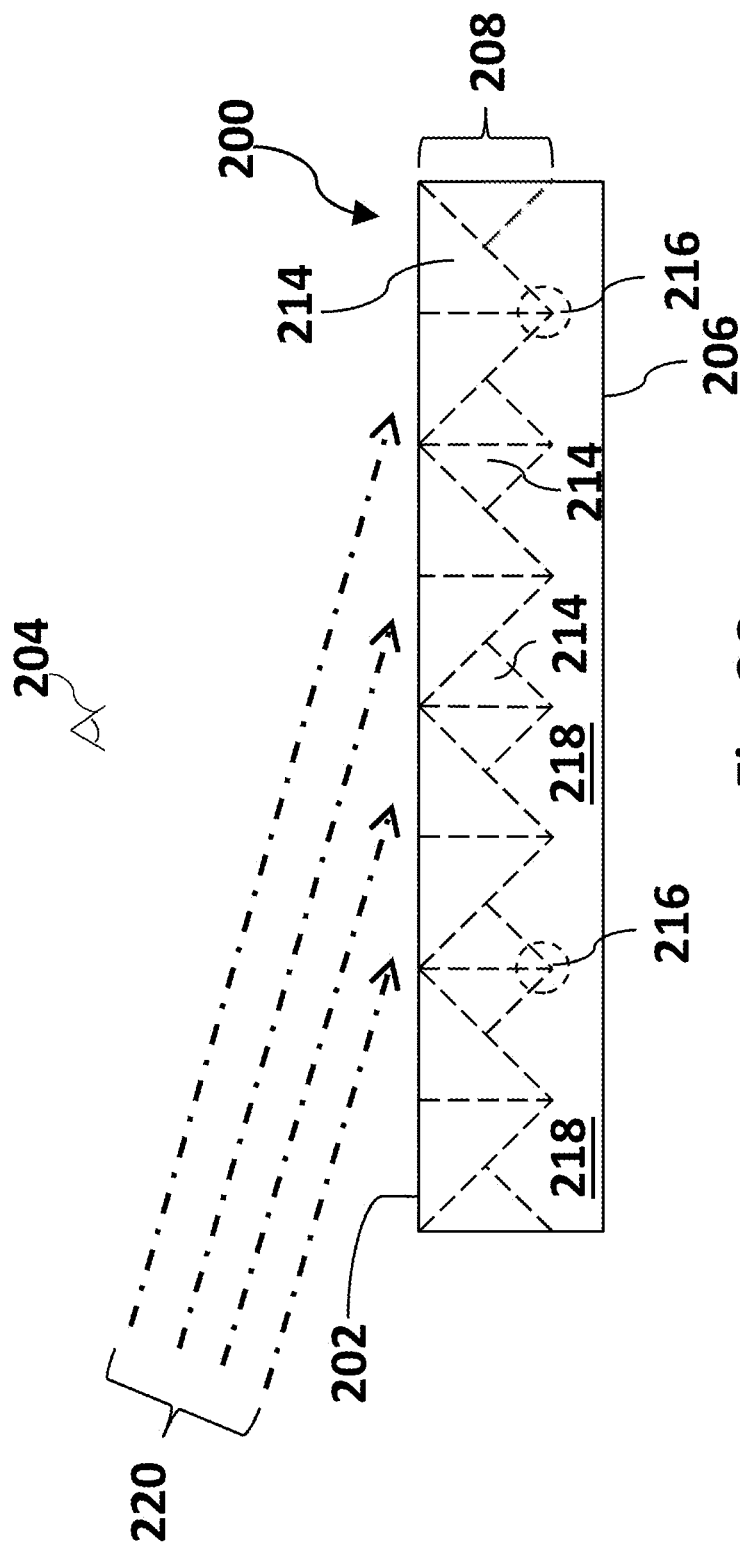
FIG. 2C illustrates a cross-section of directional coating of a corner reflector sheet according to one embodiment of the disclosure.

FIG. 2C illustrates a cross-section of directional coating of a corner reflector sheet according to one embodiment of the disclosure. Corner reflector sheet 200 may be directionally coated with a metal layer from various directions. The directional coating is represented by dot-dashed lines 220. Sheet 200 may be metallized at a glancing angle such that the deep recess points 216 may not be covered with a metal coating. In this embodiment, only a portion of the corner surfaces are coated. The extent and depth of the coating can be a function of the viewing angle or the application for which the display is made. In contrast, if the coating angle is made perpendicular to the front surface 202, the entire face of sheet 200 may be coated. At least about three coating directions may be required to fully metallize the surfaces of the corner cubes.

Metallization processes that may be used to coat sheet 200 include one or more of sputtering, cathode arc deposition, atomic layer deposition (ALD), physical vacuum deposition (PVD) or chemical vacuum deposition (CVD). In an exemplary process, sheet 200 may be continuously rotated while sheet 200 is metallized to create a uniform coating on all facets of the corner cubes.

Figure 3A:
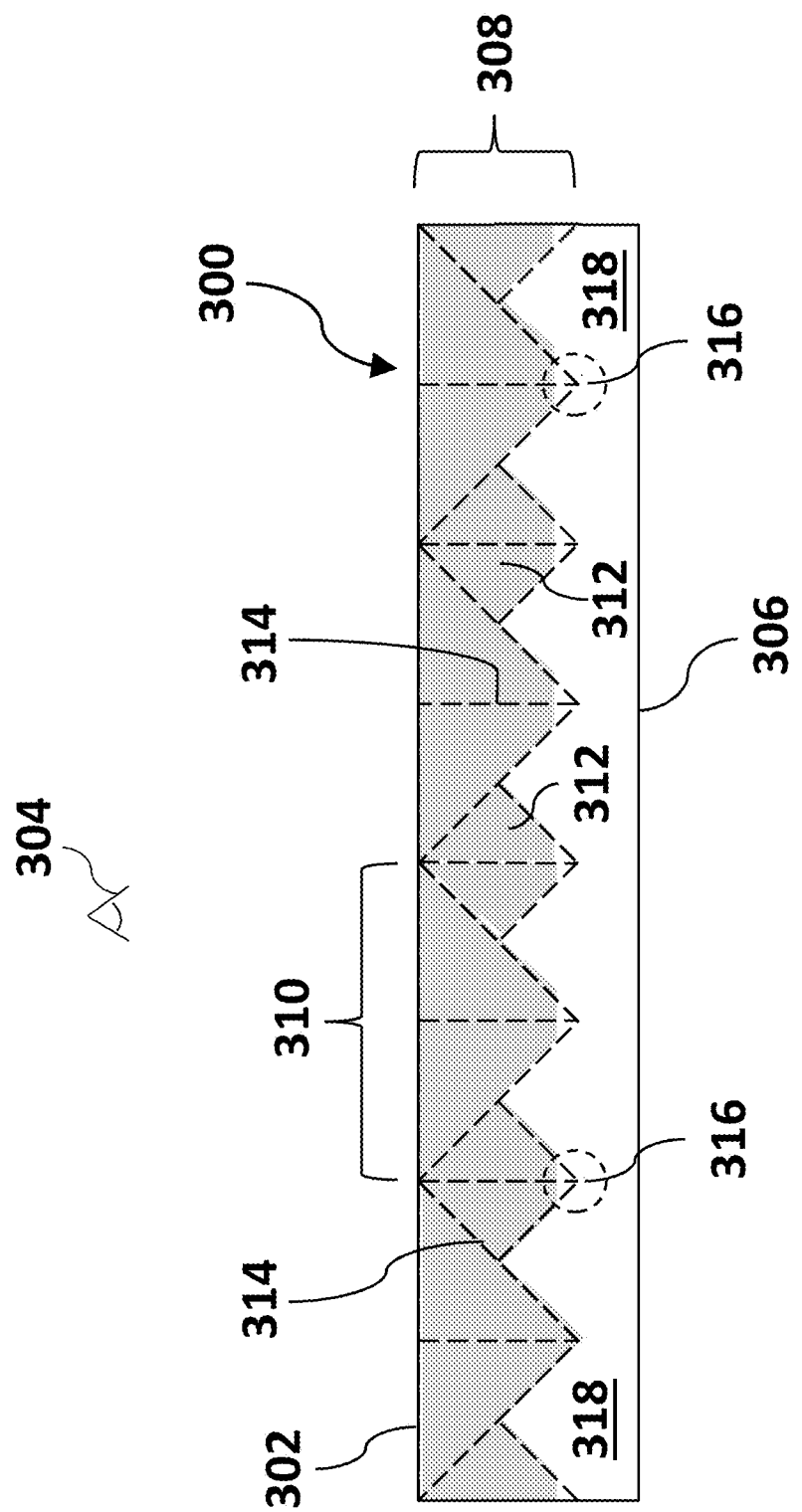
FIG. 3A illustrates a cross-section of a directionally coated corner reflector sheet.

FIG. 3A illustrates a cross-section of a directionally coated corner reflector sheet according to one embodiment of the disclosure. Sheet 300 is substantially similar to the sheet 200 of FIG. 2 except that it includes a metal layer on a top surface. Sheet 300 comprises a front surface 302 facing viewer 304, a rear surface 306 and a plurality of corner cubes 308. Each corner cube 310 may comprise three facets 312. Dotted lines 314 represent where facets 312 may be connected. Facets 312 comprise a layer of metal facing viewer 304. Sheet 300 in FIG. 3A is shaded to show where facets 312 are coated. Sheet 300 may further comprise recessed points 316 in the sheet where the metal layer does not exist. These points are denoted by dotted lined circles. Sheet 300 may further comprise a solid support (interchangeably, substrate) material 318.

Figure 3B:
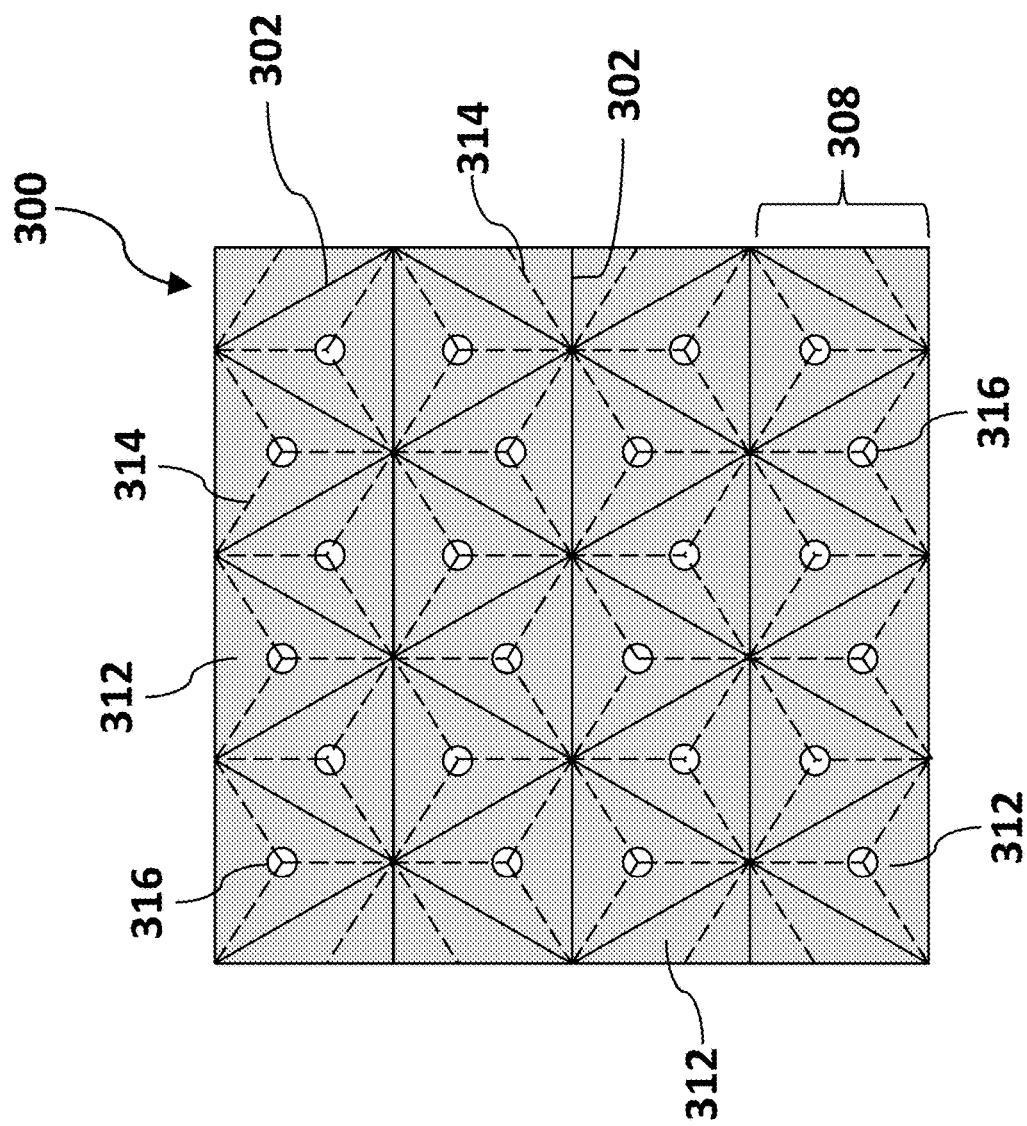
FIG. 3B illustrates a top view of a directionally coated corner reflector sheet.

FIG. 3B illustrates a top view of a directionally coated corner reflector sheet. Sheet 300 is an embodiment of a directionally coated sheet but with the deep recess points 316 in the corner cubes that may not be coated. This is a top view looking down upon the top surface of corner reflector sheet 300. Sheet 300 may comprise a plurality of rows of corner cubes 308. Each corner cube may comprise top edges 302 and three facets 312. Dotted lines 314 represent where the facets may be connected. Sheet 300 is shaded to illustrate presence of a thin metal coating on the surface. The metal coating may comprise one or more of aluminum, silver, chrome, gold or other light reflective coating. The metal coating may also be electrically conductive or semi-conductive.

Sheet 300 further comprises deep recess points 316 in each corner cube where there is no deposited metal layer. Deep recessed points are schematically represented by white circles 316 showing a general absence of a metallization layer. In one embodiment, a material different than metal layer may be used at deep recess points 316.

In one application, sheet 300 may be preferentially etched where there is no metal coating in recessed regions 316. An etchant may be used to etch the underlying sheet that is not protected by the metal coating. Chemical or plasma etching may be used. Laser ablation may be used to etch.

Figure 4:
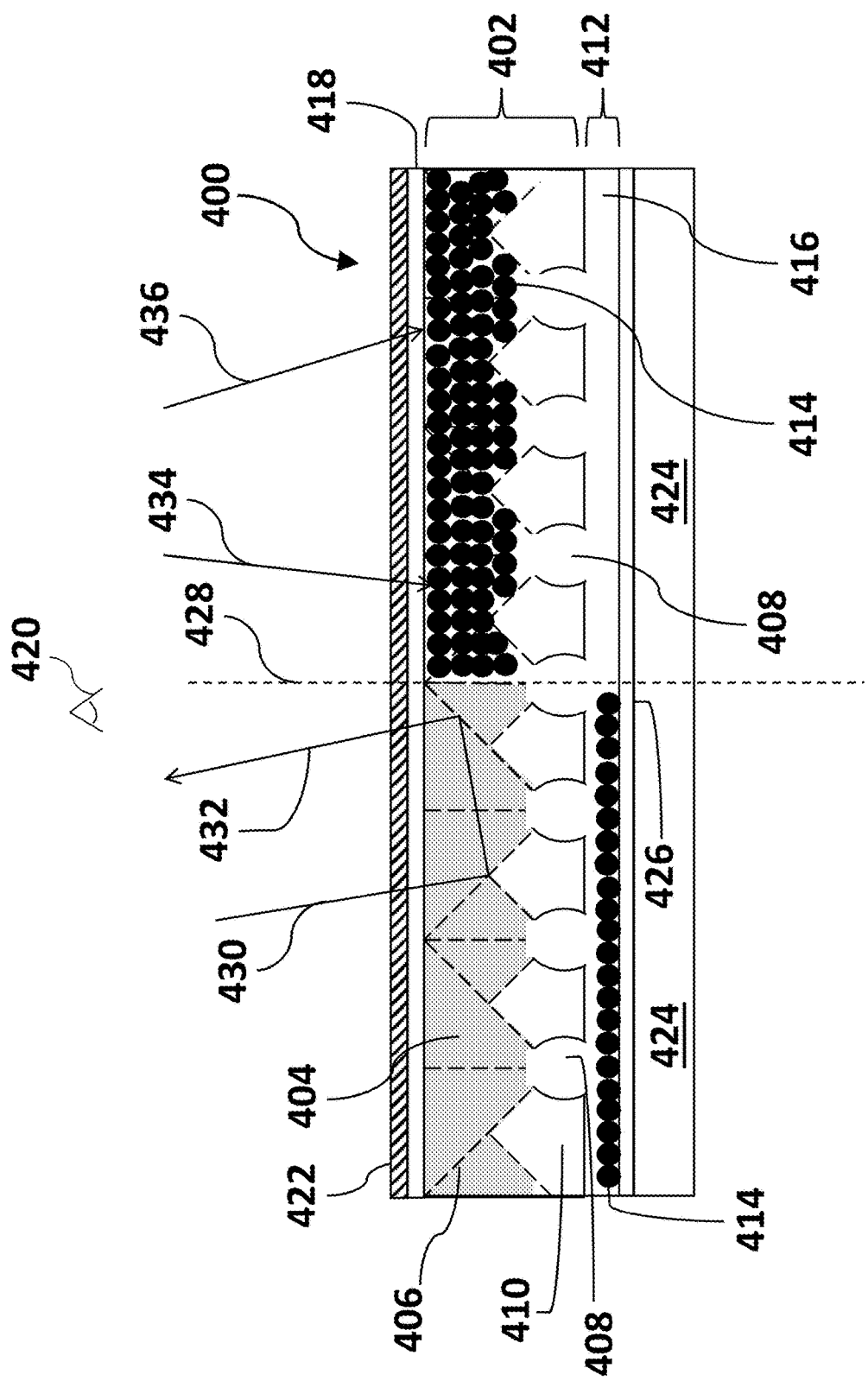
FIG. 4 illustrates an embodiment of a portion of a reflective image display comprising a directionally coated and etched corner reflector sheet.

FIG. 4 illustrates an embodiment of a portion of a reflective image display comprising a directionally coated and etched corner reflector sheet according to an exemplary embodiment. Display 400 is an embodiment of a display comprising a metallized etched sheet 402 of corner cubes. Sheet 402 may comprise one or more of a metal, plastic or glass. Sheet 402 may comprise a plurality of corner cubes similar to sheet 300. Each corner cube may comprise at least three facets 404. Dotted lines 406 represent where the facets may be connected. Among others, the metal layer on the facets 404 may operate as a light reflection layer and front electrode layer. A coating of TiO2 or other material may be added on top of the metal layer to create a whiter appearance to the viewer.

Sheet 402 may further comprise channels or vias 408 where material 410 of sheet 402 has been etched away. Display 400 may comprise a reservoir 412 that contains a plurality of light absorbing electrophoretically mobile particles 414 dispersed in medium 416. Particles 414 may comprise a dye, carbon black or a metal oxide-based pigment. Particles may comprise an inorganic material or an organic material or both an inorganic and an organic material. Particles 414 may comprise a positive or negative charge or a combination of positive and negative charges.

Medium 416 is formed in the gap between sheet 402 and rear electrode 426. Medium 416 in display 400 may comprise air, or one or more fluids or vacuum. Medium 416 may be transparent or may include color. Medium 416 may be a hydrocarbon or a halogenated hydrocarbon. In an exemplary embodiment, medium 416 may comprise a dye dissolved in a liquid.

Display 400 comprises an outer front sheet 418 facing viewer 420. Front sheet 418 may be plastic or glass or comprise both a plastic and glass. The region between the metal layer on the surface of the facets 404 and the front sheet 418 may form a void space. Channels 408 may continuously bridge the reservoir 412 with the void space between the facets 404 and front sheet 418.

Display 400 may comprise an optional outer light diffusive layer 422. Layer 422 may diffuse reflected light from sheet 402 such that the reflection appears softer to the viewer 420 and provides a paper-like appearance. Layer 422 may comprise ground glass, roughened surface of plastic, $TiO_2$ particles or other material to diffuse the light.

Display 400 may comprise a rear support sheet 424. On top of the rear support sheet may be a rear electrode layer 426. Rear electrode layer 426 may be one or more of a patterned direct drive array of electrodes, a thin film transistor (TFT) array or a passive matrix array of electrodes.

Display 400 may comprise an optional voltage bias source (not shown). A bias source may provide a bias across sheet 402 and reservoir 412 comprising particles 414 dispersed in medium 416. The bias source may form a bias to move at least one particle 414 in the region between the rear electrode layer 426 and coated metal layer on facets 404.

An exemplary implementation of display 400 is as follows. When a bias of opposite polarity as particles 414 is applied at rear electrode layer 426, particles 414 will be attracted to the rear electrode 426. This is shown to the left of dotted line 428. Incident light rays that enter the display may be reflected by the metal layer located on the facets 404 in the corner cubes of sheet 402. This is represented by incident light ray 430 being reflected by the metal-coated corner cubes in sheet 402. Semi-retro-reflected light is illustrated by light ray 432 that may be reflected back towards viewer 420. This creates a bright or white state of display 400.

In one embodiment of the disclosure an incoming light ray incident on a portion of a first facet is specularly reflected and the reflected light undergoes specular reflection on the remaining two facets such that the exiting light ray traverses substantially parallel to the incoming light ray. This embodiment is schematically illustrated at FIG. 4 where incoming light ray 430 is substantially parallel to the existing light ray 432. In another embodiment, the reflection is not substantially parallel to the incoming light. In still in another embodiment, the light ray incident on the second and the third facets undergoes specular modulation.

In certain embodiments, the exiting light ray traverses substantially parallel to the incoming light ray. That is, the exiting light ray is not offset from the incoming light ray by more than 10°, 5° or 1° from the incoming light ray. The offset of about 10° or less is deemed substantially parallel due to the nature of light.

When a bias of opposite polarity as particles 414 is be applied at the front electrode metal layer located on facets 404, particles 414 may be attracted to the metal layer (illustrated by the shaded region shown to the left of dotted line 428). Particles 414 may coat (cover) the metal layer on facets 404. This is shown to the right of dotted line 428. When incident light rays enter the display they may be absorbed by the particles 414 covering layer 418. This is represented by incident light rays 434 and 436. This condition creates a dark state of display 400 and viewer 420 will see a black color or other color that is dependent on the color of the particles used. A combination of dark and light states driven by the electrode layers may form images that convey information to the viewer 420.

In an exemplary embodiment, cavity 412 containing particles 414 and medium 416 in display 400 may be replaced by an electrofluidic system. The electrofluidic system may be used to modulate the light absorption and reflection instead of electrophoretically mobile particles 414. The electrofluidic system may comprise a polar fluid dispersed in a non-polar fluid. The fluids may comprise a negative or positive polarity or charge. In an exemplary embodiment, one fluid may comprise a color while the other fluid may be transparent. In other embodiments both fluids may comprise a color. A bias may be applied at the front electrode of display 400 of opposite charge as the charge of the colored fluid. The colored fluid may then be attracted to the surface of facets 404. In this position, the colored fluid may absorb incident light creating a dark state. If a bias of opposite polarity of the colored fluid is applied at the rear electrode layer 426, the colored fluid may be attracted to rear electrode 426. Incident light rays may be reflected towards viewer 420 at the surface of facets 404 creating a bright state of the display.

In an exemplary embodiment, display 400 may comprise at least one optional dielectric layer (not shown). The dielectric layer may be located on the surface of metallized facets 404. The dielectric layer may be located on the surface of rear electrode layer 426 or on both the metallized facets 404 and rear electrode layer 426. The dielectric layer may protect the transparent electrode layer. The dielectric layer may comprise a polymer such as parylene, a halogenated parylene or polyimide. The dielectric layer may comprise an inorganic layer such as $SiO_2$. The dielectric layer may comprise a combination of an inorganic and organic material. The dielectric layer may be pinhole-free or may have at least one pinhole.

In certain embodiment, the exemplary display of FIG. 4 may communicate with a bias source, a processing circuitry and a memory circuitry. The memory circuitry may contain instructions to direct the processing circuitry to periodically apply bias of different polarity to each of the front electrode 418 and rear electrode 426. The memory circuitry may include instructions to appropriately bias device 400 to display information to viewer 420. The embodiment may further include sensors to detect ambient light and to adjust movement of electrophoretic particles 414 to accommodate the changing ambient conditions.

Figure 5:
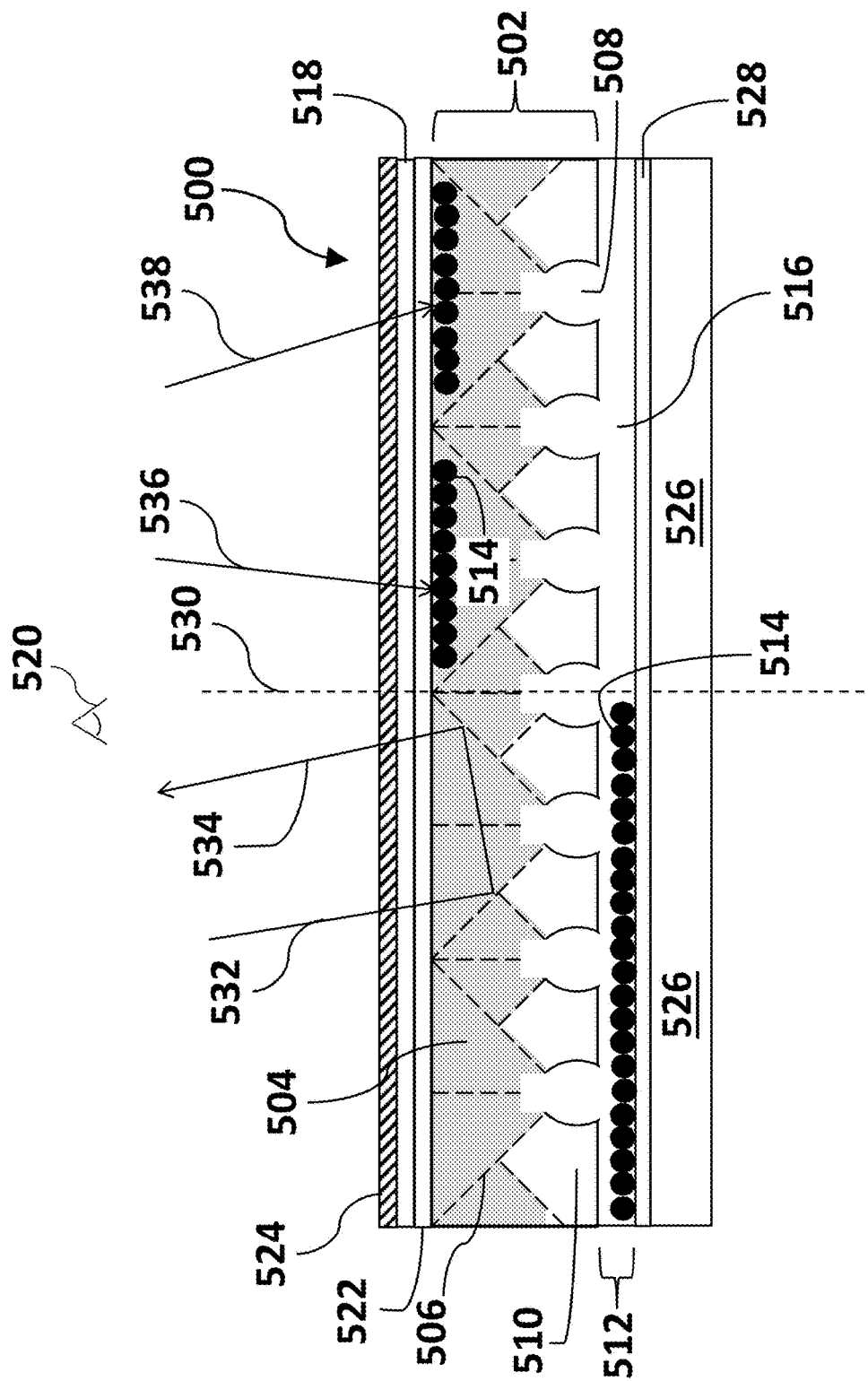
FIG. 5 illustrates an embodiment of a portion of a reflective image display comprising a directionally coated and etched corner reflector sheet.

FIG. 5 illustrates an embodiment of a portion of a reflective image display comprising a directionally coated and etched corner reflector sheet. Display 500 is an embodiment of a display comprising an etched metallized sheet 502 of corner cubes. Sheet 502 may comprise one or more of a metal, plastic or glass. Sheet 502 may comprise a plurality of corner cubes similar to sheets 300 and 400. Each corner cube comprises facets 504. Dotted lines 506 represent where the facets are connected. The metal layer on the facets 504 may operate as a light reflection layer. The shaded region represents the light reflecting metallized facets 504.

Sheet 502 may further comprise channels or vias 508 where material 510 of sheet 502 has been etched away. Display 500 may comprise a reservoir 512 that contains a plurality of light absorbing electrophoretically mobile particles 514 dispersed in a medium 516. Particles 514 may be one or more of a dye, carbon black or a metal oxide-based pigment. Particles 514 may comprise a positive or negative charge polarity or a combination of positive and negative charge polarities. In one embodiment, the particles can pass through and switch between dark and light states. I made change in paragraph 44 to describe use of channels Medium 516 in display 500, as that discussed in relation to FIG. 4, may comprise, air (or other gaseous material), vacuum or fluid. The medium may also comprise a combination of gaseous material and fluid). Medium 516 may be clear or any color. Medium 516 may be a hydrocarbon or a halogenated hydrocarbon.

Display 500 comprises an outer transparent front sheet 518 facing viewer 520. Front sheet 518 may be plastic or glass or a combination of a plastic and glass. The region between the metal surface on the facets 504 in the corner cubes and the front sheet 518 forms a void space. Channels 508 continuously bridge the reservoir 512 with the void space between the metallized facets 504 and front sheet 518.

Display 500 may comprise a transparent electrode layer 522 interposed between the transparent front sheet 518 and sheet 502. Layer 522 may comprise one or more of indium tin oxide (ITO), an electrically conducting polymer or conductive metal nanoparticles, such as aluminum, dispersed in a clear polymer matrix.

Display 500 may comprise an optional outer light diffusive layer 524 facing viewer 520. Layer 524 may diffuse reflected light from sheet 502 such that the reflection appears softer to the viewer 520 and provides a paper-like appearance. Layer 524 may comprise one or more of ground glass, roughened surface of plastic, $TiO_2$ particles or other material to diffuse the light.

Display 500 may comprise a rear support sheet 526. On top of the rear support sheet may be a rear electrode layer 528. Rear electrode layer 528 may be one or more of a patterned direct drive array of electrodes, a thin film transistor (TFT) array or a passive matrix array of electrodes.

Display 500 may comprise an optional voltage bias source (not shown). A bias source may provide a bias across sheet 502 and reservoir 512. Reservoir 512 comprises particles 514 dispersed in medium 516. The bias source may provide a switchable bias to move at least one particle 514 within channels 508 between the rear electrode layer 528 and coated metal layer on facets 504. The bias source may be coupled to one or more processors that cause a bias switch intermittently or as part of a predefined process.

In an exemplary implementation, display 500 may be operated as follows. When a bias of opposite polarity as particles 514 is applied at rear electrode 528, particles 514 may be attracted to the rear electrode 528. This is shown to the left of dotted line 530. Incident light rays that enter the display can then be reflected by the metal layer located on the facets 504 in the corner cubes of sheet 502. This is represented by incident light ray 532 being reflected by the metal-coated corner cubes in sheet 502. Semi-retro-reflected light is represented by light ray 534 that may be reflected back towards viewer 520. This creates a bright or white state of display 500.

When a bias of opposite polarity as particles 514 is applied at the transparent front electrode layer 522, particles 514 may be attracted to and collect at the surface of front electrode layer 522 adjacent transparent outer layer 518. Particles 514 may coat electrode layer 522. This is shown to the right of dotted line 530. When incident light rays enter the display they may be absorbed by particles 514. This is represented by incident light rays 536 and 538. This creates a dark state of display 500. In this manner, a combination of dark and light states driven by the electrode layers and the switchable bias forms images that convey information to viewer 520.

In an exemplary embodiment, cavity 512 containing particles 514 and medium 516 in display 500 may be replaced by an electrofluidic system (not shown). The electrofluidic system may be used to modulate the light absorption and reflection instead of electrophoretically mobile particles 514. The electrofluidic system may comprise a polar fluid dispersed in a non-polar fluid. The two fluids may be immiscible. The fluids may comprise a negative or positive polarity or charge. In an exemplary embodiment, one fluid may have a color (or be opaque) while the other fluid may be transparent. In other embodiments, both fluids may have one or different colors. A bias may be applied at front electrode 522 of display 500 of opposite charge as the charge polarity of the colored fluid. The bias may be applied between front electrode 522 and rear electrode 526. The colored fluid may then be attracted to the surface of facets 504 while the transparent fluid is attracted to the opposite electrode. In this position, the colored fluid may absorb incident light creating a dark state. If a bias of opposite polarity of the colored fluid is applied at the rear electrode layer 528, the colored fluid may be attracted to rear electrode 528. Incident light rays may be reflected towards viewer 520 at the surface of facets 504 creating a bright state of the display. In still another embodiment, the application of bias to the first of the two (or more) fluidic system may cause opaqueness in the first fluid. As the bias increases, the medium (or a portion of the medium) may get darker. This technique can also be used to modulate the incoming light rays.

In an exemplary embodiment, display 500 may comprise at least one optional dielectric layer (not shown). The dielectric layer may be located on inward side of the transparent front electrode layer 522 interposed between layers 522 and 502. The dielectric layer may be located on the surface of rear electrode layer 528 or on both the front 522 and rear electrode layer 528. The dielectric layer be optionally used to, among others, protect the transparent front electrode layer. The dielectric layer may comprise a polymer such as parylene, a halogenated parylene or polyimide. The dielectric layer may comprise an inorganic layer such as $SiO_2$. The dielectric layer may comprise a combination of an inorganic and organic material. The dielectric layer may be pinhole-free or may have at least one pinhole.

In other embodiments, any of the reflective image displays comprising a sheet with an array of metallized corner cube structures may further include at least one spacer structure. Spacer structures may be used in order to control the gap between the sheet or corner cubes and the rear electrode. Spacer structures may be used to support the various layers in the displays. The spacer structures may be in the shape of circular or oval beads, blocks, cylinders or other geometrical shapes or combinations thereof. The spacer structures may comprise one or more of a glass, metal, plastic or other resin.

In other embodiments, any of the reflective image displays comprising a sheet with an array of metallized corner cube structures may further include at least one edge seal. An edge seal may be one or more of a thermally cured material or a photo-chemically cured material. The edge seal may comprise one or more of an epoxy, silicone or other polymer based material.

In an exemplary embodiment, a directional front light may be employed with the reflective display embodiments comprising a sheet with an array of metallized corner cube structures. The light source may be one or more of a light emitting diode (LED), a cathode fluorescent lamp (CCFL) or a surface mount technology (SMT) incandescent lamp. As discussed in relation to FIG. 4, an exemplary embodiment including processor and memory circuitries may be configured to adjust directional front lighting to accommodate changing ambient conditions.

Various control mechanisms for the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM), random access memory (RAM), magnetic disk storage media, optical storage media, a flash memory, etc.

In some embodiments, a tangible machine-readable non-transitory storage medium that contains instructions may be used in combination with the reflective displays comprising a sheet with an array of metallized corner cube structures. In other embodiments the tangible machine-readable non-transitory storage medium may be further used in combination with one or more processors.

FIG. 6 schematically illustrates an exemplary system for controlling a display according to an embodiment of the disclosure. In FIG. 6, display 600 is controlled by controller 602 having processor 604 and memory 606. Other control mechanisms and/or devices may be included in controller 602 without departing from the disclosed principles. Controller 602 may define hardware, software or a combination of hardware and software. For example, controller 602 may define a processor programmed with instructions (e.g., firmware). Processor 604 may be an actual processor or a virtual processor. Similarly, memory 606 may be an actual memory (i.e., hardware) or virtual memory (i.e., software).

Memory 606 may store instructions to be executed by processor 604 for driving display embodiments 400 or 500. The instructions may be configured to operate displays 400, 500. In one embodiment, the instructions may include biasing electrodes associated with displays 400, 500 through power supply 608. When biased, the electrodes may cause movement of electrophoretic particles to a region proximal to the front electrode to thereby absorb light. Absorbing the incoming light creates a dark state of displays 400, 500. By appropriately biasing the electrodes, mobile light absorbing particles (e.g., particles 414 in FIG. 4 or particles 514 in FIG. 5) may be summoned to a location away from the front electrode (e.g., electrode 522, FIG. 5). Moving particles to a location away from the front electrode causes light to be reflected at the surface of the facets of the plurality of metallized corner cubes (e.g., facets 404 in FIG. 4 and facets 504 in FIG. 5). Reflecting the incoming light creates a light state of display 400 or 500.

In some embodiments, an electrofluidic system may be used to modulate the absorbed and reflected light instead of electrophoretic particles. By appropriately biasing the electrodes, colored fluids of one charge polarity may be summoned to a location away from the front electrode (e.g., electrode 522, FIG. 5). Moving particles to a location away from the front electrode causes light to be reflected at the surface of the facets of the plurality of metallized corner cubes (e.g., facets 404 in FIG. 4 and facets 504 in FIG. 5). Reflecting the incoming light creates a light state of display 400 or 500.

In the display embodiments described herein, they may be used in such applications such as in, but not limited to, electronic book readers, portable computers, tablet computers, cellular telephones, smart cards, signs, watches, wearables, shelf labels, flash drives and outdoor billboards or outdoor signs comprising a display.

The following examples are provided to further illustrate non-limiting implementation of the disclosed principles. Example 1 is directed to a retro-reflective electronically switchable display structure, comprising: an array of corner cube structures, each corner cube structure comprising at least three facets, each facet positioned substantially at an angle with respect to a remaining two facets such that an incoming light ray incident on a portion of a first facet is specularly reflected and the reflected light undergoes specular reflection on the remaining two facets such that an exiting light ray traverses substantially parallel to the incoming light ray; a substrate supporting the array of corner cube structures; and wherein at least one of the corner cube structures forms a prism, the prism having an apex and a base and wherein the apex forms a channel to receive a plurality of electrophoretically mobile particles.

Example 2 is directed to the retro-reflective display of example 1, wherein at least one of the corner cube structure comprises three facets which form a prism and wherein a reflective surface of the prism is partially coated with a light reflecting coating.

Example 3 is directed to the retro-reflective display of any preceding example, wherein at least one of the three facets is directionally coated.

Example 4 is directed to the retro-reflective display of any preceding example, wherein at least one facet is coated with a material selected from the group consisting of aluminum, gold, chrome, copper, $TiO_2$ and silver.

Example 5 is directed to the retro-reflective display of any preceding example, wherein the exiting light ray traverses a path that deviates by not more than 10 degrees from the path of the incoming ray.

Example 6 is directed to a retro-reflective image display device, comprising: a front electrode; an array of corner cube structures, each corner cube structure comprising at least three facets, each facet positioned substantially at an angle with respect to a remaining two facets such that an incoming light ray incident on a portion of a first facet is specularly reflected and the reflected light undergoes specular reflection on the remaining two facets such that an exiting light ray traverses substantially parallel to the incoming light ray; a rear electrode; a substrate supporting the array of corner cube structures; a plurality of channels positioned between the corner cube structure and the rear electrode; and wherein each of the plurality of channels is configured to communicate one or more electrophoretically mobile particles between the rear electrode and the front electrode.

Example 7 is directed to the retro-reflective image display device of example 6, wherein at least one of the corner cube structure comprises three facets which form a prism, the prism having an apex and a base and wherein the apex forms an opening to receive the electrophoretically mobile particles.

Example 8 is directed to the retro-reflective image display device of any preceding example, wherein a light reflective face of the prism is partially coated.

Example 9 is directed to the retro-reflective image display device of any preceding example, wherein at least one of the three facets is directionally coated.

Example 10 is directed to the retro-reflective image display device of any preceding example, further comprising a clear substrate to form a front sheet.

Example 11 is directed to the retro-reflective image display device of any preceding example, further comprising a medium to suspend the electrophoretically mobile particles.

Example 12 is directed to the retro-reflective image display device of any preceding example, further comprising a bias source in communication with a processor and a memory system, the memory system including instructions to direct the processor and the bias source to cause the electrophoretically mobile particles to traverse between the rear electrode and the front electrode.

Example 13 is directed to the retro-reflective image display device of any preceding example, wherein the exiting light ray traverses a path that deviates by not more than 10 degrees from the path of the incoming ray.

Example 14 is directed to a retro-reflective image display device, comprising: a front electrode; an array of corner cube structures, each corner cube structure comprising at least three facets, each facet positioned substantially at an angle with respect to a remaining two facets such that an incoming light ray incident on a portion of a first facet is specularly reflected and the reflected light undergoes specular reflection on the remaining two facets such that an exiting light ray traverses substantially parallel to the incoming light ray; a rear electrode; a substrate supporting the array of corner cube structures; each of the three facets of each corner cube structure is partially coated; and wherein at least one of the corner cube structures forms a prism, the prism having an apex and a base and wherein the apex forms a channel to receive a plurality of electrophoretically mobile particles.

Example 15 is directed to the retro-reflective image display device of any preceding example, wherein each of the three facets of each corner cube structure is directionally coated.

Example 16 is directed to the retro-reflective image display device of any preceding example, wherein the apex of the prism forms a channel to communicate the one or more electrophoretically mobile particles between the rear electrode and the front electrode.

Example 17 is directed to the retro-reflective image display device of any preceding example, further comprising a clear substrate to form a front sheet proximal to the front electrode.

Example 18 is directed to the retro-reflective image display device of any preceding example, further comprising a medium to suspend the electrophoretically mobile particles.

Example 19 is directed to the retro-reflective image display device of any preceding example, further comprising a bias source in communication with a processor and a memory system, the memory system including instructions to direct the processor and the bias source to cause the electrophoretically mobile particles to traverse between the rear electrode and the front electrode through the apex.

Example 20 is directed to a retro-reflective image display device, comprising: a front electrode; an array of corner cube structures, each corner cube structure comprising at least three facets, each facet positioned substantially at an angle with respect to a remaining two facets such that an incoming light ray incident on a portion of a first facet is specularly reflected and the reflected light undergoes specular reflection on the remaining two facets such that an exiting light ray is traverses substantially parallel to the incoming light ray; a rear electrode, the rear electrode and the front electrode forming a gap therebetween; a first fluid and a second fluid disposed in the gap, wherein the first fluid and the second fluid are substantially immiscible; a substrate supporting the array of corner cube structures; each of the three facets of each corner cube structure is partially coated.

Example 21 is directed to the retro-reflective image display device of any preceding example, wherein at least one of the corner cube structures forms a prism, the prism having an apex and a base and wherein the apex forms a channel to fluidically communicate with the gap.

Example 22 is directed to the retro-reflective image display device of any preceding example, further comprising a clear substrate to form a front sheet proximal to the front electrode.

Example 23 is directed to the retro-reflective image display device of example 20, wherein the first fluid is opaque relative to the second fluid.

Example 24 is directed to the retro-reflective image display device of any preceding example, further comprising a bias source in communication with a processor and a memory system, the memory system including instructions to direct the processor and the bias source to cause the second fluid to traverse adjacent the front electrode to absorb an incoming light ray and thereby form a dark state.

While the principles of the disclosure have been illustrated in relation to the exemplary embodiments shown herein, the principles of the disclosure are not limited thereto and include any modification, variation or permutation thereof.

What is claimed is:

1. An electrophoretic retro-reflective image display device, comprising:
a front electrode;
an array of corner cube structures, each corner cube structure comprising at least three facets, each facet positioned substantially at an angle with respect to a remaining two facets such that an incoming light ray incident on a portion of a first facet is specularly reflected and the reflected light undergoes specular reflection on the remaining two facets such that an exiting light ray traverses substantially parallel to the incoming light ray;
a rear electrode;
a substrate supporting the array of corner cube structures; and
a plurality of channels positioned between the corner cube structure and the rear electrode;
wherein each of the plurality of channels is configured to communicate one or more electrophoretically mobile particles between the rear electrode and the front electrode through the corner cube structures.

2. The retro-reflective image display device of claim 1, wherein at least one of the corner cube structure comprises three facets which form a prism, the prism having an apex and a base and wherein the apex forms an opening to receive the electrophoretically mobile particles.

3. The retro-reflective image display device of claim 2, wherein a light reflective face of the prism is partially coated.

4. The retro-reflective image display device of claim 1, wherein at least one of the three facets is directionally coated.

5. The retro-reflective image display device of claim 1, further comprising a clear substrate to form a front sheet.

6. The retro-reflective image display device of claim 1, further comprising a medium to suspend the electrophoretically mobile particles.

7. The retro-reflective image display device of claim 1, further comprising a bias source in communication with a processor and a memory system, the memory system including instructions to direct the processor and the bias source to cause the electrophoretically mobile particles to traverse between the rear electrode and the front electrode.

8. The retro-reflective image display device of claim 1, wherein the exiting light ray traverses a path that deviates by not more than 10 degrees from the path of the incoming ray.

* * * * *